US008107197B2

(12) United States Patent
Fontana, Jr. et al.

(10) Patent No.: US 8,107,197 B2
(45) Date of Patent: Jan. 31, 2012

(54) SLIDER WITH INTEGRATED WRITER AND SEMICONDUCTOR HETEROSTUCTURE READ SENSOR

(75) Inventors: Robert E. Fontana, Jr., San Jose, CA (US); Bruce Alvin Gurney, San Jose, CA (US); Ernesto E. Marinero, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 530 days.

(21) Appl. No.: 12/345,812

(22) Filed: Dec. 30, 2008

(65) Prior Publication Data

US 2010/0165511 A1    Jul. 1, 2010

(51) Int. Cl.
*G11B 15/64*    (2006.01)
(52) U.S. Cl. .................. 360/235.1; 360/314; 360/234.3; 360/234.4; 360/235.4
(58) Field of Classification Search .............. 360/235.1, 360/314, 234.3, 234.4, 235.4
See application file for complete search history.

(56) References Cited

U.S. PATENT DOCUMENTS

| | | | | |
|---|---|---|---|---|
| 4,809,103 A | 2/1989 | Lazzari | ........................ | 360/103 |
| 5,166,849 A | 11/1992 | Fedeli | ............................ | 360/112 |
| 5,181,149 A | 1/1993 | Katsumata et al. | ........... | 360/119 |
| 5,476,804 A | 12/1995 | Lazzari | ........................... | 437/51 |
| 5,502,325 A | 3/1996 | Sokolich et al. | ............... | 257/421 |
| 5,587,857 A | 12/1996 | Voldman et al. | ............... | 360/103 |
| 5,657,189 A | 8/1997 | Sandhu | ........................ | 360/112 |
| 5,680,280 A | 10/1997 | Seabaugh et al. | ............. | 360/110 |
| 6,870,717 B2 | 3/2005 | Childress et al. | .......... | 360/324.2 |
| 6,882,503 B2 | 4/2005 | Sasaki et al. | ................ | 360/234.7 |
| 7,185,416 B2 | 3/2007 | Sasaki et al. | ................ | 29/603.12 |
| 7,253,991 B2 | 8/2007 | Fontana, Jr. et al. | .......... | 360/126 |
| 7,607,214 B2 * | 10/2009 | Reiley et al. | ................ | 29/603.12 |
| 7,964,924 B2 * | 6/2011 | Akinaga et al. | ................ | 257/421 |
| 2003/0201461 A1 * | 10/2003 | Sato et al. | ...................... | 257/197 |
| 2004/0218309 A1 | 11/2004 | Seigler | .......................... | 360/313 |
| 2006/0193080 A1 | 8/2006 | Chattapadhyay et al. | ..... | 360/112 |
| 2007/0188933 A1 | 8/2007 | Carey | ............................. | 360/313 |
| 2009/0179226 A1 * | 7/2009 | Teo et al. | ....................... | 257/190 |
| 2009/0195939 A1 * | 8/2009 | Gurney et al. | ................. | 360/314 |

FOREIGN PATENT DOCUMENTS

| | | |
|---|---|---|
| JP | 59218616 | 12/1984 |
| JP | 2257411 | 10/1990 |
| JP | 6176336 | 6/1994 |

\* cited by examiner

*Primary Examiner* — Connie Yoha
(74) *Attorney, Agent, or Firm* — Zilka-Kotab, PC (57) ABSTRACT

A slider for magnetic data recording having a semiconductor based magnetoresistive sensor such as a Lorentz magnetoresistive sensor formed on an air bearing surface of the slider body. The slider is constructed of Si, which advantageously provides a needed physical robustness as well being compatible with the construction of a semiconductor based sensor thereon. A series of transition layers are provided between the surface of the Si slider body and the semiconductor based magnetoresistive sensor in order to provide a necessary grain structure for proper functioning of the sensor. The series of transition layers can be constructed of layers of SiGe each having a unique concentration of Ge.

25 Claims, 7 Drawing Sheets

SLIDER WITH INTEGRATED WRITER AND SEMICONDUCTOR HETEROSTUCTURE READ SENSOR

FIELD OF THE INVENTION

The present invention relates generally magnetic data recording and more particularly to a slider having a magnetic write head and a semiconductor heterostructure based read sensor, both formed on the slider.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, or spacer layer, sandwiched between first and second ferromagnetic layers, referred to as a pinned layer and a free layer. First and second leads are connected to the spin valve sensor for conducting a sense current therethrough. The magnetization of the pinned layer is oriented generally perpendicular to the air bearing surface (ABS) and the magnetic moment of the free layer is oriented generally parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

However, a significant problem presented by such GMR sensors is that of excessive magnetic noise or signal noise, which limits ability of GMR sensors to achieve ever increasing data rates and areal densities needed for current and future data recording applications. Magnetic noise arises from the thermal fluctuations of the free layer at the sensor ambient temperature, as the magnetic order competes with the thermally-induced magnetic disorder. As the sensor gets smaller, this magnetic noise increases. It is already a significant part of the signal noise budget in GMR sensors and will play an ever increasing role as devices are made smaller.

An important class of potential magnetoresistive sensors, magnetic recording sensors and scanning sensors, called Lorentz Magnetoresistors, rely on the Lorentz force resulting from the motion of a charged carrier in a magnetic field. One type of such devices is called a Hall sensor. Another is what has been called an Extraordinary Magnetoresistive Sensor (EMR). An advantage of these sensors is that the active region of the sensor is constructed of non-magnetic semiconductor materials, and does not suffer from the problem of magnetic noise that exists in giant magnetoresistive sensors (GMR) and tunnel valves, both of which use magnetic films in their active regions.

The EMR sensor includes a pair of voltage leads and a pair of current leads in contact with one side of the active region and an electrically conductive shunt in contact with the other side of the active region. In the absence of an applied magnetic field, sense current through the current leads passes into the semiconductor active region and is shunted through the shunt structure. When an applied magnetic field is present, current is deflected from the shunt and more current passes through the semiconductor active region, thereby increasing the electrical resistance of the device. This change in electrical resistance in response the applied magnetic field is detected across the voltage leads. EMR is described by T. Zhou et al., "Extraordinary magnetoresistance in externally shunted van der Pauw plates", Appl. Phys. Lett., Vol. 78, No. 5, 29 Jan. 2001, pp. 667-669.

SUMMARY OF THE INVENTION

The present invention provides a slider for magnetic data recording that includes a semiconductor based magnetoresistive sensor formed on a Si slider body. A series of transition layers are formed between the slider body and the sensor in order to provide the necessary grain structure for proper functioning of the sensor.

The use of a Si slider body substrates advantageously provides the necessary physical robustness for use in a magnetic data recording system, while also allowing compatibility with the semiconductor based magnetoresistive sensor. The transition layers can be a series of layers of SiGe, each layer having a Ge content higher than that of the layer below it. This series of layers gradually alters the grains structure to allow the semiconductor based magnetoresistive sensor to function when formed on the Si slider body.

The semiconductor based magnetoresistive sensor can be a Lorentz magnetoresistive sensor, and can include a structure that forms a quantum well structure. A Lorentz magnetoresistive sensor operates based on the action of Lorentz forces charge carriers flowing through a two dimensional electron gas or hole gas.

A slider can also include a write head formed on the air bearing surface of the slider body, rather than on the leading edge of the slider body. Forming the write head on or within the air bearing surface of the slider body allows the write head to be formed on the same wafer surface as the semiconductor based sensor.

Forming the slider body of Si provides an additional advantage, in that it makes possible the integration of amplification electronics within the slider body. An amplifier, such as a CMOS or MOSFET amplifier can be integrated directly into the slider to amplify a signal from the semiconductor based magnetoresistive sensor, thereby greatly reducing signal noise.

These and other features and advantages of the invention will be apparent upon reading of the following detailed description of preferred embodiments taken in conjunction with the figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
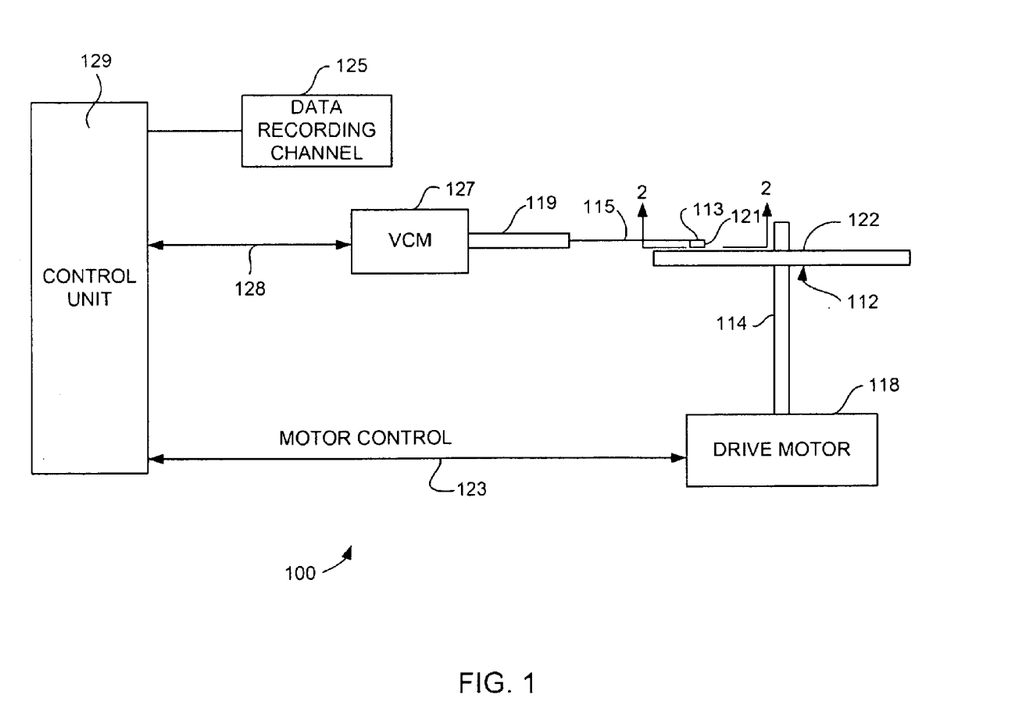
FIG. 1 is a schematic illustration of a disk drive system in which the invention might be embodied.

Referring now to FIG. 1, there is shown a disk drive 100 which could embody this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
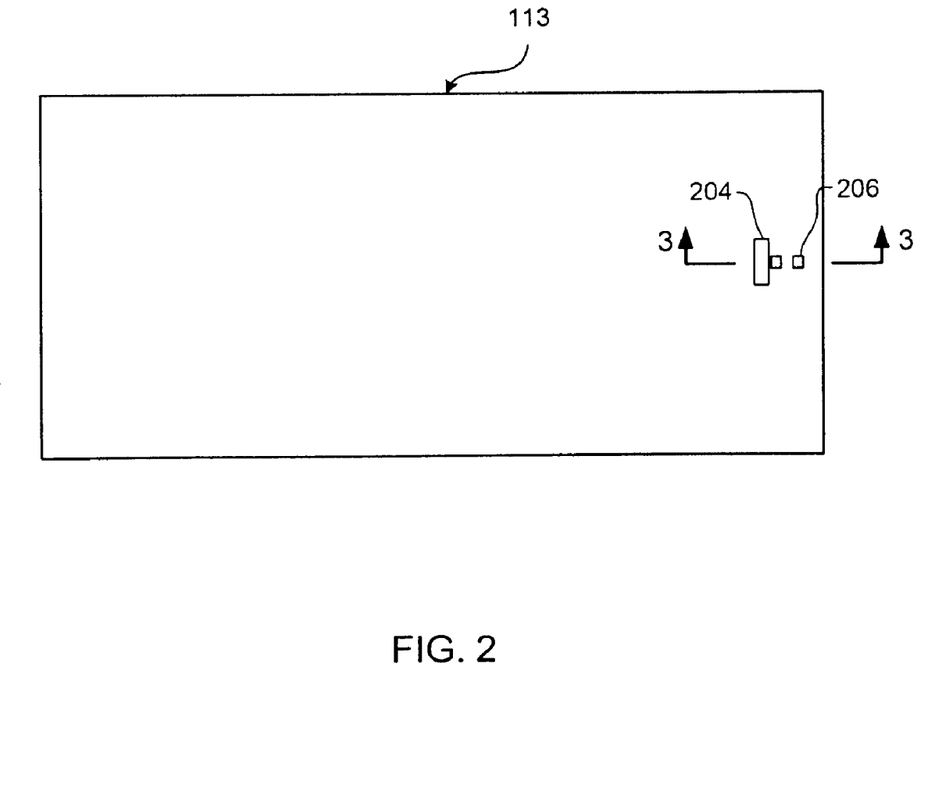
FIG. 2 is an ABS view of a slider illustrating the location of a magnetic head thereon.

With reference to FIG. 2, the orientation of a magnetic read head 202 and a write head 204 on a slider 113 can be seen in more detail. FIG. 2 is an ABS view of the slider 113, and as can be seen the read head 202 and write head 204 are located at a trailing edge of the slider, within the ABS surface. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
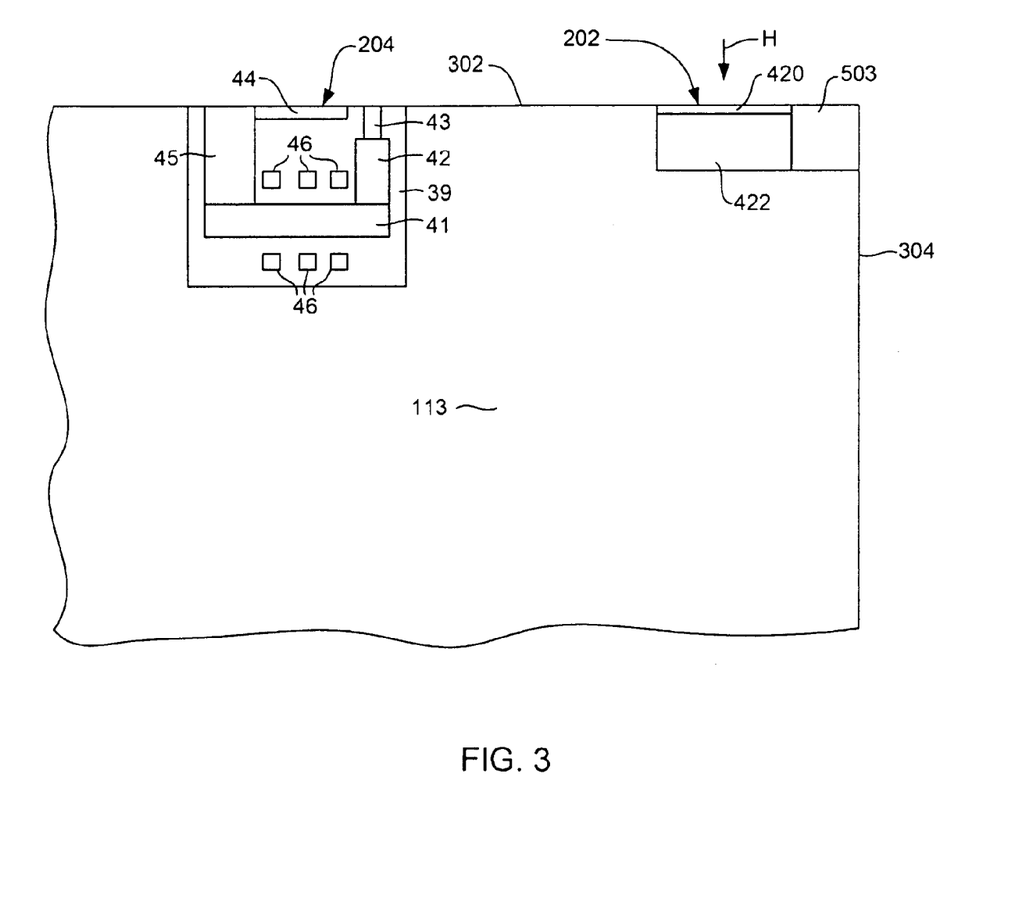
FIG. 3 is an enlarged, side cross sectional view taken from line 3-3 of FIG. 2.

FIG. 3 shows an enlarged, cross sectional view of the read and write heads 202, 204 on the slider 113, the view being taken from line 3-3 of FIG. 2. As can be seen, the write head 204 is constructed into the air bearing surface 302 of the slider 113, and the read head 202 can be closer the leading edge 304 of the slider 113.

As those skilled in the art will appreciate, in a standard slider currently used in magnetic recording a sensor, such as a giant magnetoresistive (GMR) sensor or tunnel junction (TMR) sensor is formed on wafer surface, and a write head is formed on the wafer surface as well. This wafer is then cut into rows of slider and lapped. This lapping forms the air bearing surface of the wafer. The surface of the wafer on which the read and write heads are formed ends up defining the trailing edge of the slider. In these prior art sliders, this arrangement works because the sensor (whether GMR or TMR) operates with the magnetic field or transitions in the magnetic field being oriented parallel with the layers making up the sensor, and perpendicular to the air bearing surface. These magnetic fields, are also parallel to the layers making up the write head of such prior art sensor, so both the read heads and write heads have been traditionally been formed on a wafer on a surface that ends up being the trailing edge surface of the slider.

However, using a sensor that is constructed as a semiconductor heterostructure such as a Lorentz magnetoresistive sensor 202, presents unique manufacturing challenges. This is because the sensor is built up on a semiconductor substrate, and the finished sensor (which will be described in greater detail below) detects magnetic fields and transitions oriented in a direction perpendicular to the layers of the sensor, as indicated by the arrow H in FIG. 3. This means that, for use in a magnetic recording system, the sensor must be formed on the wafer on a surface that will become the air bearing surface 302. This presents challenges, not only to the construction of the sensor 202, but also to the construction of the write head 204, which now must be constructed in a direction perpendicular that of prior art designs.

Another challenge to the construction of a slider 113 having a semiconductor based sensor such as a Lorentz magnetoresistive sensor, is that the sensor must be constructed on a semiconductor substrate, which must have a material and grain structure that will allow the sensor 202 to function correctly. Prior art sliders having GMR or TMR read heads formed on their leading edges, have been constructed of very hard materials such as AlTiC, which exhibit excellent strength, hardness and corrosion resistance and therefore, have good physical properties for withstanding the hard environment of a slider in a magnetic memory system.

Unfortunately, substrate materials such as AlTiC are incompatible with semiconductor based sensors 202. This incompatibility results in part from a mismatch of material properties such as thermal conductivity, coefficient of thermal expansion and hardness. On the other hand materials on which semiconductor based sensor can be grown, such as GaAs are far too soft and "crumbly" to be used as slider body substrates in a magnetic recording system.

The present invention provides solutions to both of these challenges (1) integrating a write head on a slider with a semiconductor based read head, and (2) providing a substrate structure that will allow the sensor to function, while also providing sufficient physical integrity of the slider body. The invention also provides for additional benefits with regard to the amplification of sensor signal, all of which will be described in greater detail herein below.

Figure 4:
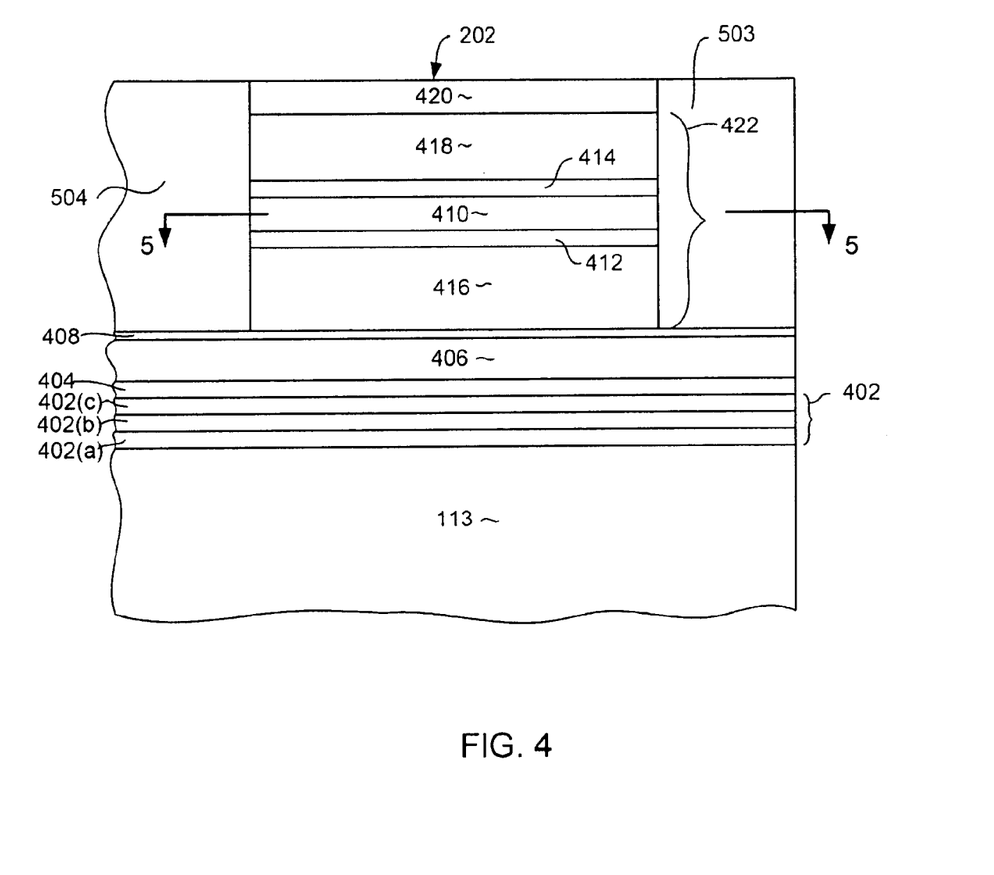
FIG. 4 is a cross sectional view of Lorentz magnetoresistive sensor.

With reference now to FIG. 4, an example of a semiconductor based read sensor 202 is shown in greater detail. In order to provide a slider body having the physical robustness to withstand an environment in a data recording system, the read head is preferrably built on a slider body substrate 113 that is constructed of Si. A series of SiGe layers 402 is formed on the Si substrate 113. This series of SiGe layers 402 includes multiple layers 402(a), 402(b), 402(c) that have progressively larger Ge compositions. While the number and exact compositions of the layers in the series 402 can vary, by way of example the series can include a first layer 402(a) formed of SiGe about 20 atomic percent Ge. A second layer 402(b), formed over the first layer 402(a), can have a composition of about 25 atomic percent, and a third layer 402(c) can have a composition of about 40 atomic percent Ge. These compositions are examples, however. The actual compositions could vary by, for example, plus or minus 5 atomic percent. Each of these layers can be, for example, 0.5-1.0 um thick or about 0.8 um thick.

A layer of Ge 404 is formed over the transition layers 402, and a layer of GaAs 406 can optionally be formed over the Ge layer 404 (for reasons that will be explained further below). If a GaAs layer 406 is present, then a Ge interfacial layer 408 can be provided above the GaAs layer 406.

Using this series of layers 402, as well as layers 406 and 408 gradually transitions the grains structures of these layers in a way that allows a semiconductor based sensor 202 to be successfully constructed on a Si substrate (slider body) 113. Si, when used as a slider body substrate has been found to provide the desired physical robustness for use in a magnetic data recording system, while also being compatible with the formation of a semiconductor based magnetoresistive sensor 202 (when used with layers 402, 406, 408 as described above).

Figure 5:
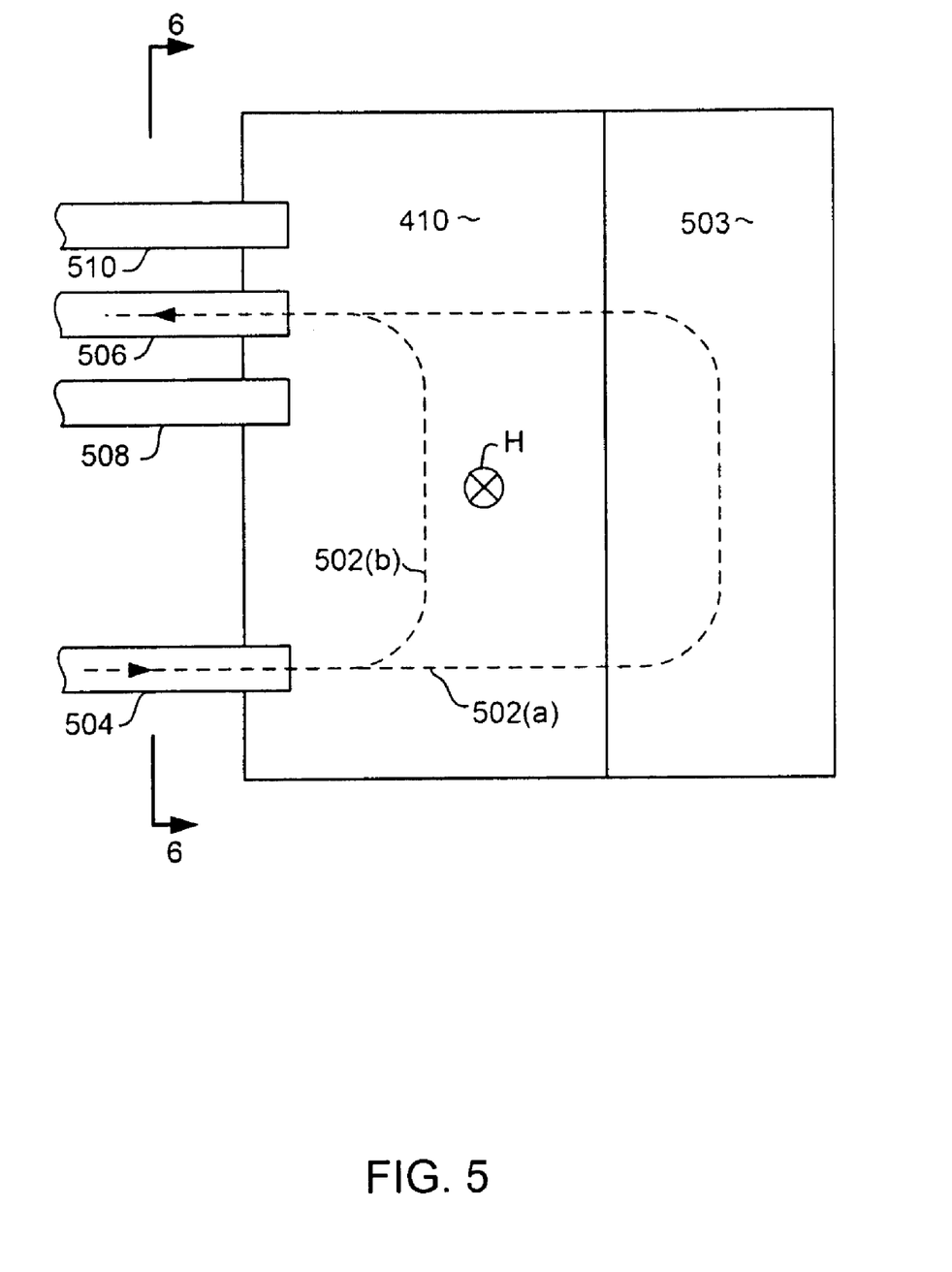
FIG. 5 is top-down sectional view taken from line 5-5 of FIG. 4.

With reference to FIGS. 4 and 5, the construction and function of an exemplary semiconductor based magnetoresistive sensor 202 is described. The sensor described herein 202 is a Lorentz magnetoresistive sensor, in that it relies on the effect of Lorentz forces on charge carriers in the presence of a magnetic field. The sensor 202 can include a magnetically active layer 410, such as a 2 dimensional electron gas (2DEG) or two dimensional hole gas. This layer can be constructed of a material such as InAs, and can have a thickness of 100 to 150 Angstroms or about 125 Angstroms.

This active layer 410 can be sandwiched between first and second liner layers 412, 414 each of which can be constructed of AlSb, and which can have a thickness of 15 to 25 Angstroms or about 20 Angstroms. The layers 410, 412 and 414 can be sandwiched between first and second barrier layers 416, 418, each of which can be constructed of a material such as AlGaSb, and which can have a thickness of 100 to 200 Angstroms of about 140 Angstroms. A capping layer 420 such as InAs may be provided at the top of the sensor 202.

The layers 410-418 together form a quantum well structure 422. The active layer 410 has a band gap that is less than that of the liner layers 412, 414, and also less than that of the barrier layers 416, 418. Therefore, charge carriers traveling through the quantum well structure 422 become trapped within the active layer 410, thereby forming a two dimensional electron gas or two dimensional hole gas.

FIG. 5 shows a top down cross sectional view taken from line 5-5 of FIG. 4. In this figure the path of charge carriers 502 can be seen flowing through the active film 410. The sensor 202 includes an electrically conductive shunt structure 502 formed at a first side of the active layer 410, constructed of a non-magnetic, electrically conductive material such as Au. First and second current leads I1 504 and I2 506 are formed at a second side of the active layer 410 opposite the shunt structure 502. Also, first and second voltage leads V1 508 and V2 510 are also formed at the second side of the active layer 410. The voltage leads 508, 510 are preferably arranged at either side of one of the current leads, for example I2 506.

When a sense current is applied to the active layer 410 through the current leads 504, 506, the resulting charge carriers 502 flow through the active layer 410. In the absence of a magnetic field, more of the charge carriers flow through the active layer to the shunt structure 503, as indicated by dashed line 502(b), where they travel with very little resistance. However, in the presence of a magnetic field H, oriented perpendicular to the plane of the active layer 410, Lorentz forces acting on the charge carriers 502(a) cause more of these charge carriers to be deflected into the active layer 410 so that they do not flow through the shunt structure 503. These charge carriers 502(a) then experience a higher electrical resistance, which can be measured as a voltage increase across the voltage leads 508, 510. Therefore, by measuring the voltage across the voltage leads 508, 510, the presence of the magnetic field H can be detected.

As discussed above the sensor 202 must be built up on the air bearing surface of the slider 113. This means that the construction of the write head must also be modified to accommodate this orientation. With reference again to FIG. 3, a write head 204 is shown that can be formed on the air bearing surface 302 of the slider 113 so that it can be built up on the same wafer surface as the magnetoresistive sensor 202. The construction of such a write head is described in detail in commonly assigned U.S. Pat. No. 7,253,991 entitled PLANAR PERPENDICULAR RECORDING HEAD, which is incorporated herein by reference as if fully set forth herein.

Such a write head 204 can include a magnetic yoke that can include a back yoke portion 41, first and second vertical pole pieces 42, 45, a main pole piece 43 and a return pole piece 44. The yoke portions 41, 42, 43, 44, 45 can be constructed of one or more magnetic materials such as CoFe or NiFe and the main pole piece 43 is preferably a high moment magnetic piece such as CoFe. An electrically conductive write coil 46 passes through the yoke in order to induce a magnetic flux in the yoke. The coil 46 can be constructed of a material such as Cu. A non-magnetic, electrically insulating fill material such as alumina 39 can be provided to surround the write head 204. When an electrical current flows through the write coil 46, a magnetic field is produced that induces a magnetic flux to flow through the yoke 41, 42, 43, 44, 45. This causes a write field to be emitted from the tip of the main pole 43. This magnetic write field locally magnetizes a portion of a magnetic medium (not shown) before traveling back to the return pole 44. As can be seen, the write head 204 is unique in that it is formed on the air bearing surface 302 of the slider 113 so that it can be constructed on the same wafer surface as that on which the semiconductor based read sensor 202 is formed.

As discussed above, constructing the slider body 113 of Si advantageously provides the structure for depositing an appropriate template for proper growth of the semiconductor from which the sensor is formed, as well as exhibiting the necessary physical robustness for use in a magnetic data recording system. However, the Si slider body substrate 113 provides an additional advantage in allowing integrated signal amplification to be incorporated into the slider. An amplifier such as a CMOS or MOSFET amplifier can be built into the substrate right at the location where the leads exit the sensor 202. Because the signals coming from the sensor 202 are inherently very weak, providing amplification within the slider itself greatly improves overall system signal to noise ratio as compared with a sensor having amplification provided merely within arm electronics located remote from the slider itself.

Figure 6:
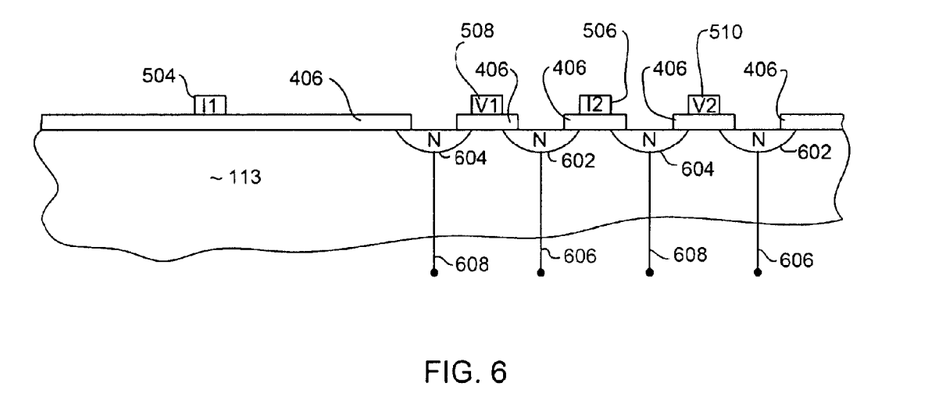
FIG. 6 is a schematic view illustrating integrated amplification of a Lorentz magnetoresistive sensor.

With reference now to FIG. 6, current and voltage leads 504, 506, 508, 510 are shown in cross section as viewed from line 6-6 of FIG. 5. The GaAs layer 406 separates the leads 504, 506, 508, 510 from the Si Substrate 113. "N" doped regions 602, 604 are formed as wells within the Si substrate. Each of the N doped regions 602 can be connected with an electrical lead 606, for example to provide a source current at the N doped region 602. A lead 608 can be connected with each of the other N doped regions 604 to provide a drain from which a signal can be read. This built in signal amplification is beneficial in extending the usefulness of semiconductor based magnetoresistive sensors in the detection of bet dimensions in the nano-scale regime as will be required for Tb/in$^2$ recording.

Figure 7:
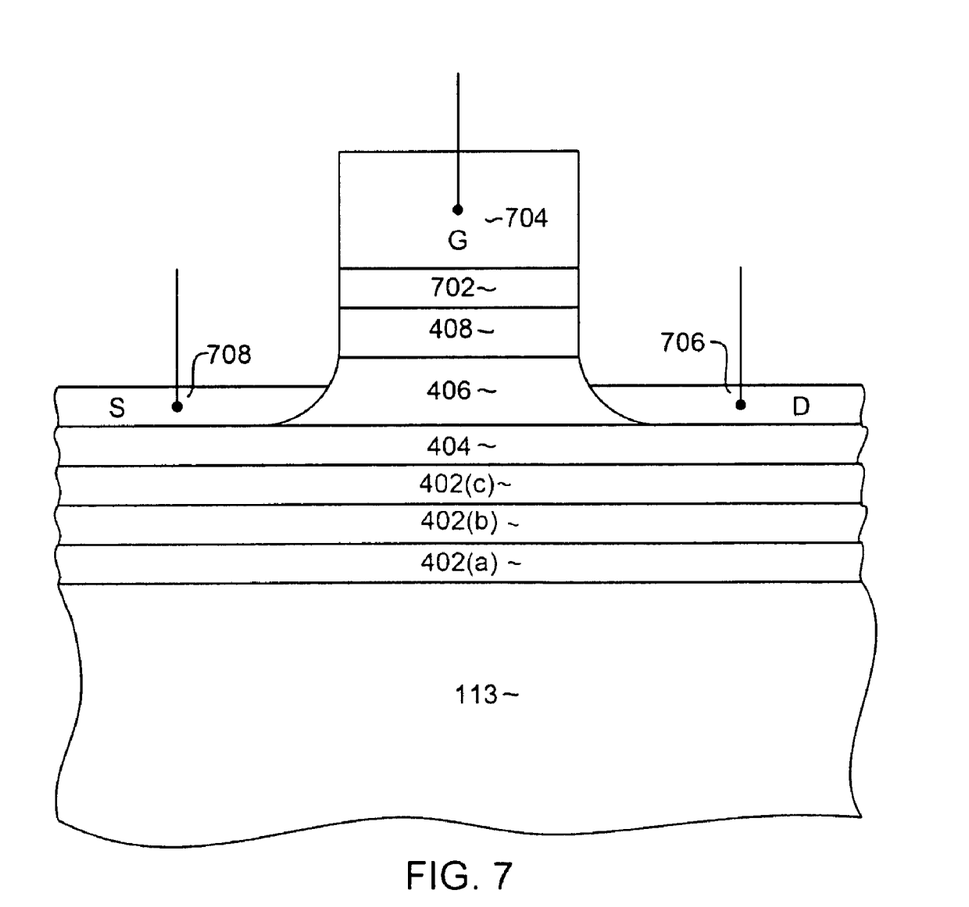
FIG. 7 is a schematic view further detailing an integrated amplification according to a possible embodiment of the invention.

Another example of integrated signal amplification is shown in detail with reference to FIG. 7. The previously described layers 402, 404, 406, 408 are formed on the Si substrate 113. By way of review, the series of layers 402 include layer 402(a), 402(b), 402(c) constructed of SiGe having increasing Ge compositions. The layer 404 can be a layer of Ge, and the layer 406 can be GaAs. The layer 408 can be a Ge interfacial layer. A layer of HfO$_2$ 702 is formed over the Ge interfacial layer 408, and a TaN layer 704 can be formed over the layer 702 to provide a gate electrode. An electrode 706 can be 706 can be formed at one side of the gate 704 to provide a drain, and another electrode 708 can be formed at the other side of the gate 704 to provide a source. These layers can then form a solid state amplifier such as a Field Effect Transistor (FET) for amplifying a signal from the voltage leads 508, 510 (FIG. 5) from the magnetoresistive sensor 202. The incorporation of an amplifier into a semiconductor based magnetoresistive sensor is further described in commonly assigned U.S. patent application Ser. No. 11/858,816, filed Sep. 20, 2007, entitled, EMR SENSOR WITH INTEGRATED SIGNAL AMPLIFICATION, which is incorporated herein by reference as if fully set forth herein.

The above embodiments, such as described with reference to FIG. 3, provide a means for constructing a write head on a wafer together with a semiconductor based magnetoresistive sensor. Alternatively, it would also be possible to construct a write head on a separate wafer using conventional thin film techniques. A slider portion having a write head, could then be bonded to a slider portion having a semiconductor based magnetoresistive sensor. This would then allow the write head to be properly oriented relative to the sensor, while still allowing the write head to be constructed by conventional manufacturing techniques.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A slider for magnetic data recording, comprising:
a slider body comprising Si;
a series of transition layers formed over the slider body; and
a semiconductor based magnetoresistive sensor formed over the series of transition layers.

2. The slider as in claim 1 wherein the series of transition layers comprises a plurality of layers of SiGe, each layer having a unique Ge concentration.

3. The slider as in claim 1 wherein the series of transition layer comprises a plurality of layers of SiGe, each layer having a Ge concentration that is higher than that of a layer beneath it.

4. A slider for magnetic data recording:, comprising:
a slider body comprising Si;
a series of transition layers formed over the slider body; and
a semiconductor based magnetoresistive sensor formed over the series of transition layers wherein the series of transition layers comprises a first layer of SiGe having a Ge concentration of 15 to 25 atomic percent, a second layer of SiGe formed over the first layer and having a Ge concentration of 20-30 atomic percent, and a third layer of SiGe formed over the second layer and having a Ge concentration of 35-45 atomic percent.

5. A slider for magnetic data recording, comprising:
a slider body comprising Si;
a series of transition layers formed over the slider body: and
a semiconductor based magnetoresistive sensor formed over the series of transition layers wherein the series of a first layer of SiGe having a Ge concentration of about 20 atomic percent, a second layer of SiGe formed over the first layer and having a Ge concentration of about 25 atomic percent, and a third layer of SiGe formed over the second layer and having a Ge concentration of about 40 atomic percent.

6. The slider as in claim 1 further comprising a layer of Ge between the series of transition layers and the semiconductor based magnetoresistive sensor.

7. A slider for magnetic data recording, comprising:
a slider body comprising Si;

a series of transition layers formed over the slider body; and
a semiconductor based magnetoresistive sensor formed over the series of transition layers further comprising a layer of Ge between the series of transition layers and the semiconductor based magnetoresistive sensor, and a layer of GaAs between the layer of Ge and the semiconductor based magnetoresistive sensor.

8. A slider for magnetic data recording, comprising:
a slider body comprising Si;
a series of transition layers formed over the slider body;
a semiconductor based magnetoresistive sensor formed over the series of transition layers; and
first and second layers of Ge both locate between the semiconductor based magnetoresistive sensor and the series of transition layers, and a layer of GaAs sandwiched between the first and second layers of Ge.

9. A slider for magnetic data recording, comprising:
a slider body comprising Si;
a series of transition layers formed over the slider body; and
a semiconductor based magnetoresistive sensor formed over the series of transition layers wherein the second layer of Ge is located between the layer of GaAs and the semiconductor based magnetoresistive sensor and is a thin interfacial layer.

10. The sensor as in claim 1 wherein the semiconductor based magnetoresistive sensor is a Lorentz magnetoresistive sensor.

11. The sensor as in claim 1 wherein the semiconductor based magnetoresistive sensor comprises a quantum well structure.

12. The sensor as in claim 1 wherein the semiconductor based magnetoresistive sensor comprise first second and third layers, the second layer being between the first and third layers and having a band gap less than a band gap of each of the first and third layers.

13. The sensor as in claim 1 wherein the semiconductor based magnetoresistive sensor comprises:
an active layer;
first and second liner layers; and
first and second barrier layers; wherein
the active layer is sandwiched between the first and second liner layers and the first and second liner layers and the active layer are located between the first and second barrier layers.

14. A slider for magnetic data recording, comprising:
a slider body comprising Si;
a series of transition layers formed over the slider body; and
a semiconductor based magnetoresistive sensor formed over the series of transition layers wherein:
the semiconductor based magnetoresistive sensor comprises:
an active layer;
first and second liner layers; and
first and second barrier layers; wherein
the active layer is sandwiched between the first and second liner layers and the first and second liner layers and the active layer are located between the first and second barrier layers; and wherein
the active layer comprises InAs;
the first and second liner layers each comprise AlSb; and
the first and second barrier layers each comprise AlGaSb.

15. A slider for magnetic data recording, comprising:
a slider body comprising Si, and having an air bearing surface (ABS);
a series of transition layers formed over the ABS of the slider body;
a semiconductor based magnetoresistive sensor formed over the series of transition layers; and
a magnetic write head formed into the ABS of the slider.

16. A slider for magnetic data recording, comprising:
a slider body comprising Si, and having an air bearing surface (ABS);
a series of transition layers formed over the ABS of the slider body;
a semiconductor based magnetoresistive sensor formed over the series of transition layers; and
a magnetic write head formed into the ABS of the slider wherein the write head includes a main pole piece having a first thickness measured perpendicular to the ABS and being formed in a first thin film plane from a first thin film disposed parallel to a substrate surface and the ABS formed in a first thin film plane from a first thin film disposed parallel to a substrate surface and the air-bearing surface; and a return pole piece, disposed in the first thin film plane, the return pole piece being formed from the first thin film, having a thickness that is approximately equal to the first thickness and having a volume larger than a volume of the main pole piece.

17. A slider for magnetic data recording, comprising:
a slider body comprising Si, and having an air bearing surface (ABS);
a series of transition layers formed over the ABS of the slider body;
a semiconductor based magnetoresistive sensor formed over the series of transition layers; and
a magnetic write head formed into the ABS of the slider wherein the write head includes a main pole piece having a first thickness measured perpendicular to the ABS and being formed in a first thin film plane from a first thin film disposed parallel to a substrate surface and the ABS formed in a first thin film plane from a first thin film disposed parallel to a substrate surface and the air-bearing surface; and a return pole piece, disposed in the first thin film plane, the return pole piece being formed from the first thin film, having a thickness that is approximately equal to the first thickness and having a volume larger than a volume of the main pole piece;
wherein the write head further comprises:
a first vertical pole piece;
a second vertical pole piece; and
a coil of electrically conductive material a portion of which passes between the first and second vertical pole piece;
wherein, the main pole piece is disposed on the first vertical pole piece at the air bearing surface and the main pole piece is smaller than the first vertical pole piece and the return pole piece is disposed on the second vertical pole piece at the air bearing surface, the return pole piece extending closer to the main piece than the second vertical pole piece.

18. A slider for magnetic data recording, comprising:
a slider body comprising Si, and having an air bearing surface (ABS);
a series of transition layers formed over the ABS of the slider body;
a semiconductor based magnetoresistive sensor formed over the series of transition layers; and
a magnetic write head formed into the ABS of the slider;
wherein the slider body has a substrate surface, the substrate surface supporting thin films disposed parallel to the ABS;

wherein the write head further comprises a yoke comprising first and second vertical pole pieces;
a coil of electrically conductive material wrapping around the first or second vertical pole piece;
a main standoff of ferromagnetic material disposed on the first vertical pole piece at the ABS;
a main pole piece disposed on the main standoff, the main pole piece being made from a first thin film;
a return standoff of ferromagnetic material disposed on the second vertical pole piece at the ABS; and
a return pole piece disposed on the return standoff at the ABS, the return pole piece being made from the first thin film and being larger in volume than the main pole piece.

19. The slider as in claim 15 wherein the semiconductor based magnetoresistive sensor is a Lorentz magnetoresistive sensor.

20. The slider as in claim 15 wherein the semiconductor based magnetoresistive sensor comprises a structure that forms a quantum well.

21. The slider as in claim 15 wherein the series of transition layers comprises a plurality of layer of SiGe, each layer having a unique Ge concentration.

22. The slider as in claim 15 wherein the series of transition layer comprises a plurality of layers of SiGe, each layer having a Ge concentration that is higher than that of a layer beneath it.

23. The slider as in claim 1, further comprising:
first and second voltage leads connected with the semiconductor based magnetoresistive sensor; and
an amplifier integrated into the slider body and connected with at least one of the first and second voltage leads.

24. The slider as in claim 23 wherein the amplifier is a MOSFET amplifier.

25. The slider as in claim 23 wherein the amplifier is a CMOS amplifier.

* * * * *